(12) United States Patent
Chen

(10) Patent No.: US 8,926,304 B1
(45) Date of Patent: Jan. 6, 2015

(54) THREE-DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventor: Peng-Yang Chen, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 14/164,276

(22) Filed: Jan. 27, 2014

(30) Foreign Application Priority Data

Nov. 20, 2013  (TW) .............................. 102142348 A

(51) Int. Cl.
 *B29C 47/96* (2006.01)
 *B29C 67/00* (2006.01)
(52) U.S. Cl.
 CPC ................................. *B29C 67/0066* (2013.01)
 USPC ........................................................ 425/174.4
(58) Field of Classification Search
 USPC ........................................................ 425/174.4
 See application file for complete search history.

(56) References Cited

U.S. PATENT DOCUMENTS

| 4,575,330 A | 3/1986 | Hull |
| 5,597,520 A | 1/1997 | Smalley et al. |
| 2009/0051925 A1* | 2/2009 | Djordjev ........................ 356/506 |
| 2012/0195994 A1* | 8/2012 | El-Siblani et al. .......... 425/174.4 |

* cited by examiner

*Primary Examiner* — Joseph S Del Sole
*Assistant Examiner* — John Robitaille
(74) *Attorney, Agent, or Firm* — Jianq Chyun IP Office

(57) ABSTRACT

A three-dimensional printing apparatus including a tank filled with a liquid-state forming material, a platform disposed at the tank, a rotating shaft, a rotating arm, and at least one light source is provided. The rotating shaft is disposed under the tank or above the tank. The rotating arm connects to the rotating shaft such that the rotating arm is driven by the rotating shaft to rotate. The light source disposed on the rotating arm rotates along with the rotating arm and generates light projecting toward the forming material along with the part of the platform moving in the forming material, such that the forming material is solidified in layers and forms a three-dimensional object on the platform.

12 Claims, 4 Drawing Sheets

THREE-DIMENSIONAL PRINTING APPARATUS

CROSS-REFERENCE TO RELATED APPLICATION

This application claims the priority benefit of Taiwan application serial no. 102142348, filed on Nov. 20, 2013. The entirety of the above-mentioned patent application is hereby incorporated by reference herein and made a part of this specification.

BACKGROUND OF THE INVENTION

1. Field of the Invention

The invention relates to a printing apparatus, and particularly relates to a three-dimensional printing apparatus.

2. Description of Related Art

With the continuous development of science and technology, various methods using the additive manufacturing technology to construct three-dimensional (3-D) models have been proposed. Generally speaking, the additive manufacturing technology converts design data of three-dimensional models constructed with computer-aided design software, for example, into a plurality of thin (pseudo-two-dimensional) cross-sectional layers that are continuously stacked.

Currently, several ways to form the thin cross-sectional layers have been developed. For example, a movable platform may be disposed in a liquid-state forming material, and an X-Y-Z coordinate system constructed according to the design data of the three-dimensional model drives a light source to move along the X-Y coordinate and irradiate the liquid-state forming material, so as to solidify the liquid-state forming material into a desired shape of the cross-sectional layer. Then, as the movable platform moves along the Z-axis, the solidified material may be formed into a three-dimensional object through solidification in layers.

However, as the current light sources for solidifying materials are mainly laser light sources, a focal length between the laser light source and the target of irradiation is required due to the limitation of the optical element required by the laser light source. Therefore, a point light is used to linearly scan back and forth along the X-Y axis in the liquid-state forming material. Such scanning manner may produce a sawtoothed structure in the surface profile when scanning an arc or curved profile, resulting in an undesirable influence on the appearance. Thus, modifying the undesirable appearance now becomes an important issue for the artisans of this field.

SUMMARY OF THE INVENTION

The exemplary embodiment provides a three-dimensional printing apparatus that utilizes a curve of a radiation trace of a movable light source on a radiation plane to make a three-dimensional object printed accordingly have a preferable appearance.

The three-dimensional printing apparatus includes a tank, a movable platform, a rotating shaft, a rotating arm, and at least one light source. The tank is filled with a liquid-state forming material. The movable platform is movably disposed at the tank. A portion of the movable platform is immersed in the liquid-state forming material. The rotating shaft is disposed above or under the tank. The rotating arm is connected with the rotating shaft, and the rotating arm is driven by the rotating shaft to rotate. The light source is disposed on the rotating arm to rotate with the rotating arm. As the portion of the movable platform moves in the liquid-state forming material, the light source provides light to irradiate the liquid-state forming material, so as to solidify a portion of the liquid state forming material in layers and consequently form a three-dimensional object on the movable platform.

In an exemplary embodiment, a moving trace of the light source is a curve.

In an exemplary embodiment, a moving trace of the light source is at least a portion a circle.

In an exemplary embodiment, the rotating arm extends along a radial direction relative to the rotating shaft.

In an exemplary embodiment, the light source is movably disposed on the rotating arm.

In an exemplary embodiment, the three-dimensional printing apparatus further includes a plurality of light sources disposed on the rotating arm along a radial direction. At least a portion of the light sources selectively provides light to irradiate the liquid-state forming material in the tank.

Accordingly, in the exemplary embodiments, the light source is disposed on the rotating arm, such that the light trace provided by the light source on the rotating arm may be a curve on the radiation plane of the liquid-state forming material when the rotating arm rotates relative to the rotating shaft. Accordingly, the light source is allowed to irradiate the liquid-state forming material in a curved profile and consequently prevents the sawtoothed structure caused by the back-and-forth linear scanning, making the three-dimensional object printed according to the exemplary embodiments have a preferable appearance.

To make the above features and advantages of the exemplary embodiments more comprehensible, embodiments accompanied with drawings are described in detail as follows.

BRIEF DESCRIPTION OF THE DRAWINGS

The accompanying drawings are included to provide a further understanding of the exemplary embodiments, and are incorporated in and constitute a part of this specification. The drawings illustrate embodiments and, together with the description, serve to explain the principles of the exemplary embodiments.

DESCRIPTION OF THE EMBODIMENTS

Figure 1:
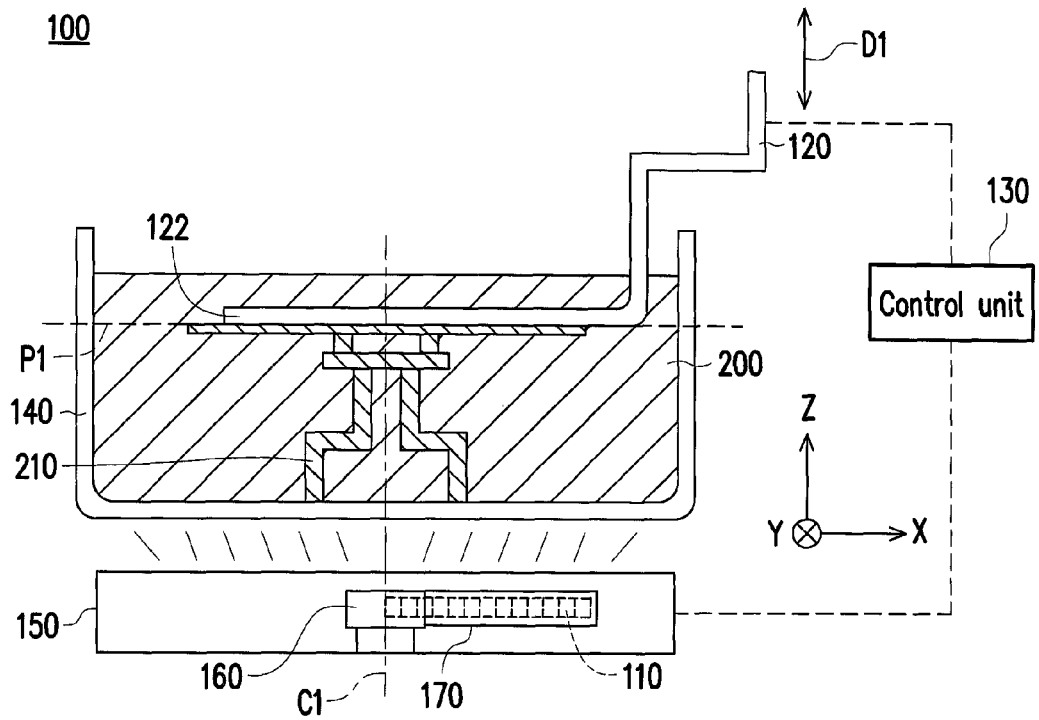
FIG. 1 is a schematic view of a three-dimensional printing apparatus according to an exemplary embodiment.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view of a three-dimensional printing apparatus according to an exemplary embodiment. An orthogonal coordinate system is provided herein for the convenience of describing relevant components. Referring to FIG. 1, a three-dimensional printing apparatus 100 in this embodiment is adapted to manufacture a three-dimensional object 210 based on a three-dimensional model (not shown). The three-dimensional model may be constructed by using computer aided design (CAD) or animation modeling software. In addition, the three-dimensional model is transversely sliced into a plurality of cross-sections for the three-dimensional printing apparatus 100 to read the three-dimensional model and manufacture the three-dimensional object 210 according to the cross-sections of the three-dimensional model.

Specifically speaking, the three-dimensional printing apparatus 100 of this embodiment includes a light source 110, a movable platform 120, a control unit 130, and a tank 140. The tank 140 is configured to be filled with a liquid-state forming material 200, the movable platform 120 is configured beside the tank 140, and a portion of the movable platform 120 is immersed into the liquid-state forming material 200 of the tank 140. The light source 110 is movably disposed under the tank 140. The control unit 130 is electrically connected with the movable platform 120 and the light source 110. Here, as the portion of the movable platform 120 moves in the liquid-state forming material 200 (from a liquid level of the liquid-state forming material 200 to a bottom of the tank 140), the light source 110 provides light to irradiate the liquid-state forming material 200, so as to solidify a portion of the liquid-state forming material 200 in layers, and finally form the three-dimensional object 210 on a base 122 of the movable platform 120. In this embodiment, the liquid-state forming material 200 is a photosensitive resin, for example, and the light source 110 provides ultraviolet light to solidify the liquid-state forming material 200. However, the exemplary embodiment is not limited thereto. Materials and means capable of forming the three-dimensional object are all applicable to the exemplary embodiment.

Figure 2:
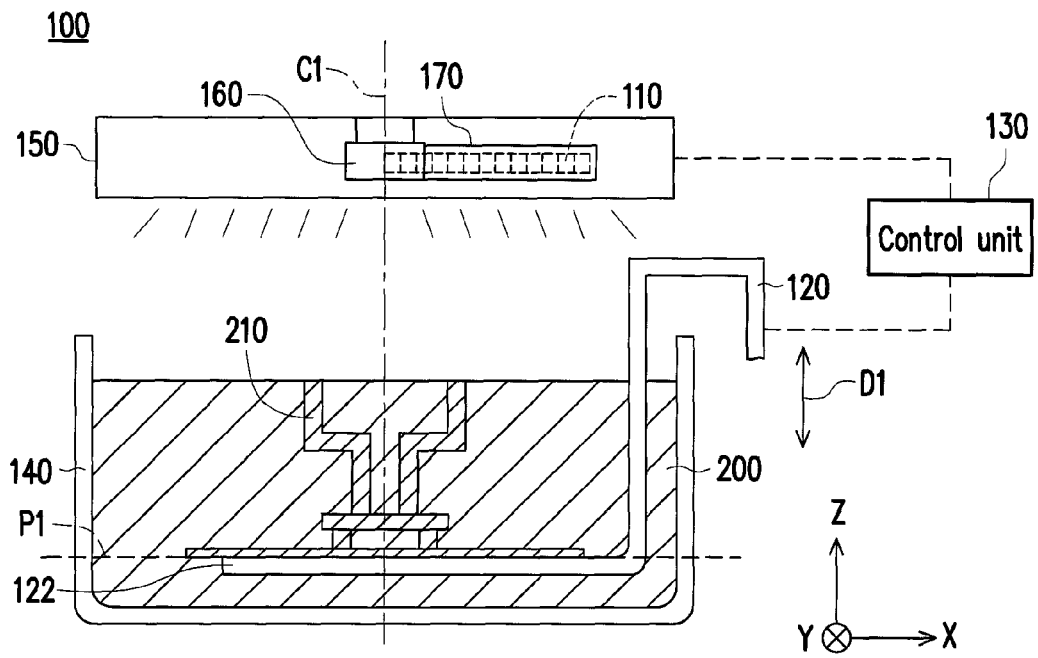
FIG. 2 is a schematic view of a three-dimensional printing apparatus according to another exemplary embodiment.

In addition, the exemplary embodiment does not limit a position of the light source relative to the tank. FIG. 2 is a schematic view of a three-dimensional printing apparatus according to another exemplary embodiment. Differing from the embodiment above, the light source 110 of this embodiment is movably disposed above the tank 140 and similarly provides a stereolithography process and generates the same effect, except that the movable platform 120 of this embodiment moves from the bottom of the tank 140 to the liquid level of the liquid-state forming material 200. The description provided below is mainly directed to the embodiment shown in FIG. 1.

Figure 3:
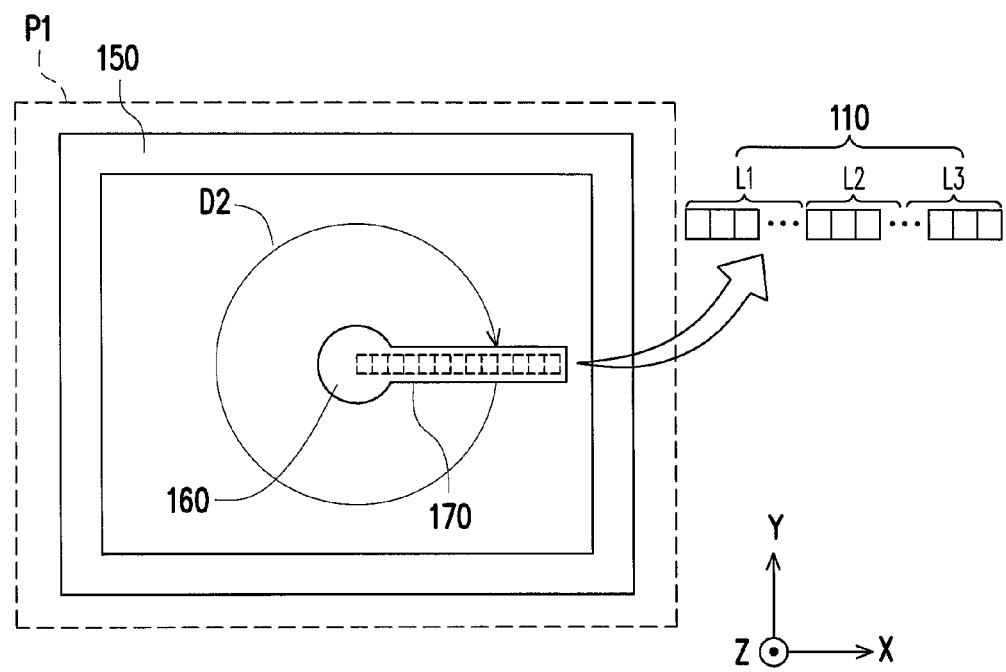
FIG. 3 is a top view of a light source of FIG. 1.

FIG. 3 is a top view of the light source 110 of FIG. 1. Referring FIGS. 1 and 3 simultaneously, it should be noted here that a moving trace D2 generated by the light source 110 on an irradiation plane P1 of the liquid-state forming material 200 (i.e. parallel to the X-Y plane) is a curve, and a moving direction D1 of the movable platform 120 (i.e. parallel to the Z-axis) is vertical to the irradiation plane P1. In this embodiment, the three-dimensional printing apparatus 100 further includes a supporting member 150, a rotating shaft 160, and a rotating arm 170. In addition, the rotating shaft 160 and the rotating arm 170 are disposed in the supporting member 150. The rotating shaft 160 provide an axial direction C1, the rotating arm 170 is radially connected with the rotating shaft 160, and the light source 110 is formed of a plurality of light-emitting elements (e.g. light-emitting diodes (LEDs)) and disposed in the rotating arm 170. Thus, the rotating arm 170 is driven by the rotating shaft 160 to rotate in the axial direction C1, such that the light source 110 located on the rotating arm 170 may form the curved moving trace D2 on the irradiation plane P1. It should be noted that the drawings of the embodiment do not serve to limit a quantity of the light-emitting elements. Due to limitation on the drawings, only a number of the light-emitting elements are shown for an illustrative purpose. Generally speaking, during a process of three-dimensional printing, it requires the light source 100 to be formed of at least three hundred light-emitting elements within an inch to manufacture the three-dimensional object 210 with a resolution of 300 dots per inch (DPI).

Furthermore, the rotating shaft 160 of this embodiment receives a control signal of the control unit 130 to adjust the rotating arm 170 to perform a rotating operation (including the rotating direction and angle) in the axial direction C1. The moving trace D2 of the light source 110 on the irradiation plane P1 may thus be a curve or at least a portion of a circle. The embodiment is described with a circular trace as a representative of the trace of the light source. However, the designer may appropriately make modification based on relevant structures, such that the trace of the light source on the irradiation plane may be in curves of other forms. With the configuration and movement of the light source 110, a sawtoothed edge found when forming a three-dimensional object having a curved profile by using a conventional point light to scan the liquid-state forming material 200 through linear scanning as is prevented.

Figure 4:
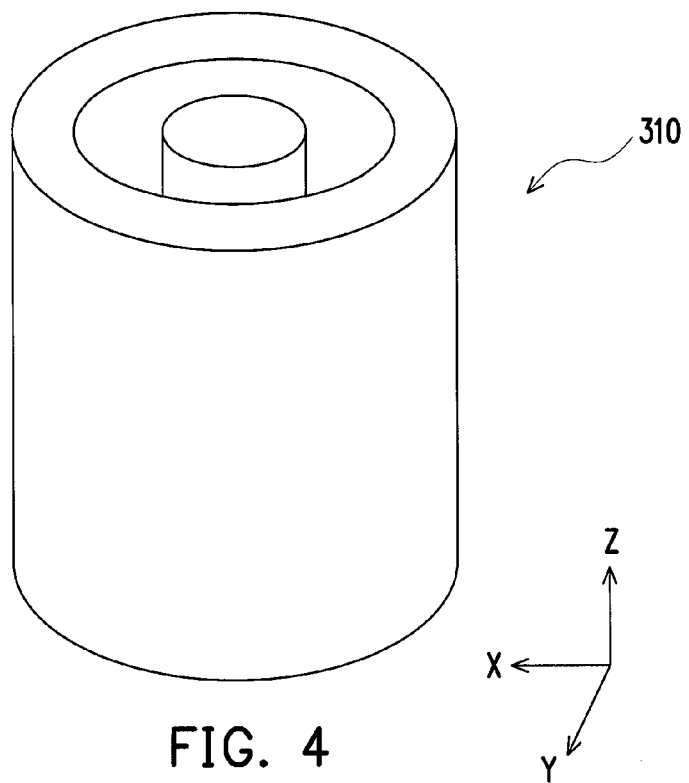
FIG. 4 is a schematic view of a three-dimensional object formed with a three-dimensional printing apparatus according to another exemplary embodiment.
Figure 5:
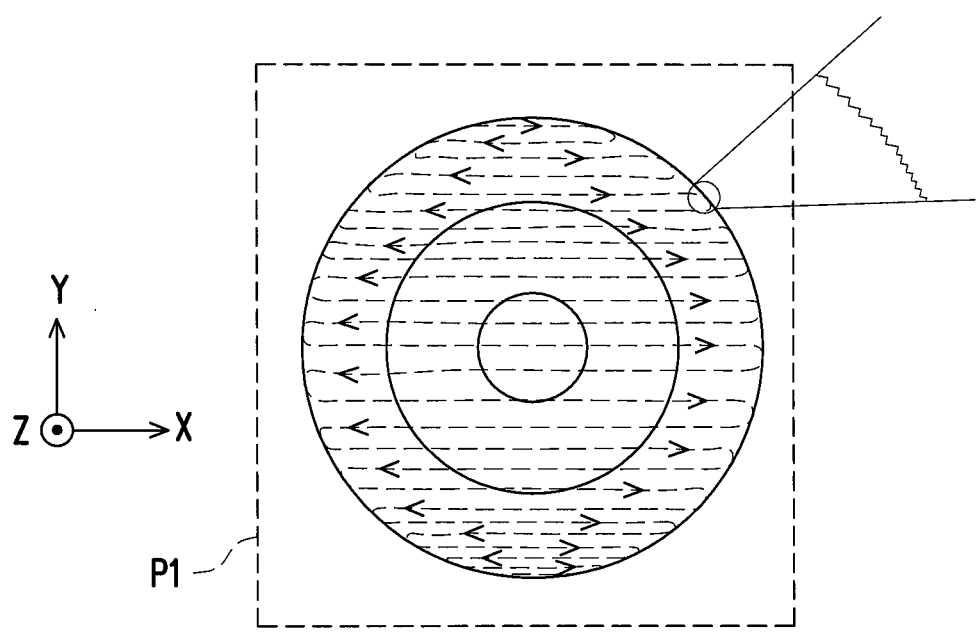
FIG. 5 is a schematic view of a trace of a point light source when a circular profile is formed through linear scanning.

For example, FIG. 4 is a schematic view of a three-dimensional object formed with a three-dimensional printing apparatus according to another exemplary embodiment. In comparison with FIG. 4, FIG. 5 is a schematic view of a trace of a point light source when a circular profile is formed through linear scanning. Referring to FIGS. 3 to 5 simultaneously, a three-dimensional object 310 in the embodiment shown in FIG. 4 is manufactured by, for example, the control unit 130 simultaneously controlling various light emitting elements to emit or not emit light while controlling the control arm 170 to rotate in the axial direction C1 relative to the rotating shaft 160. For example, the light-emitting elements shown in FIG. 2 are divided into a plurality of portions L1, L2, and L3. Each of the portions L1, L2, and L3 includes a plurality of light-emitting elements. The control unit 130 is used to control the portions L1 and L3 of the light-emitting elements to emit light and the portion L2 not to emit light, so as to solidify the liquid-state forming material 200 in layers and consequently form the three-dimensional object 310 as concentric cylinders shown in FIG. 4. In other words, the three-dimensional printing apparatus 100 of this embodiment is capable of selectively providing light to irradiate the liquid-state forming material 200 with at least a portion of the light source 110 (i.e. the portions of light-emitting elements L1 and L3). It should be noted that if the conventional point light is used to irradiate the liquid-state forming material, it is then required to linearly scan back-and-forth on the irradiation plane (i.e. the X-Y plane) to form the concentric cylinders. As shown in FIG. 5, such scanning manner results in a sawtoothed structure on the circular profile. Thus, the exemplary embodiment allows the three-dimensional objects 210 and 310 manufactured accordingly to have a smooth profile and preferable appearance quality by modifying a moving manner of the light source.

Figure 6:
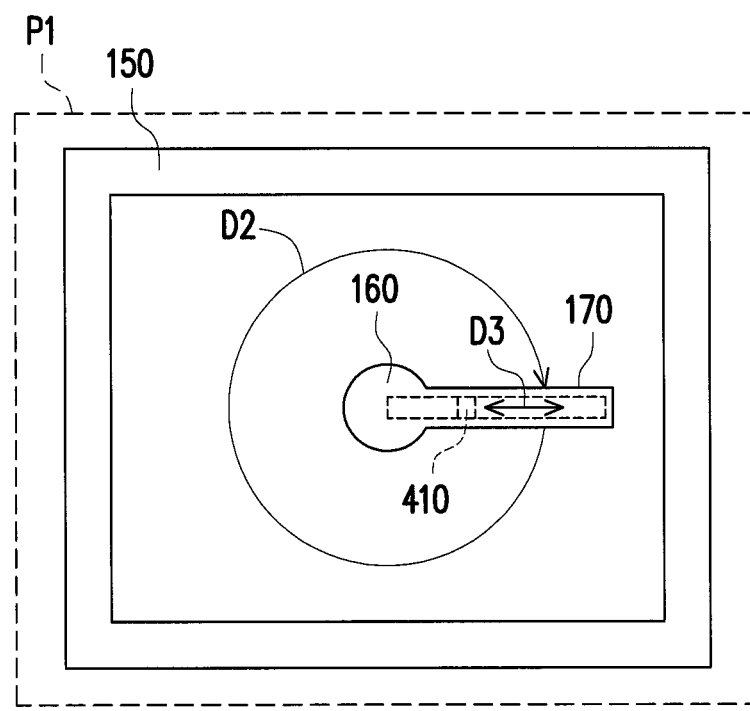
FIG. 6 is a schematic partial view of a three-dimensional printing apparatus according to another exemplary embodiment.
Figure 7:
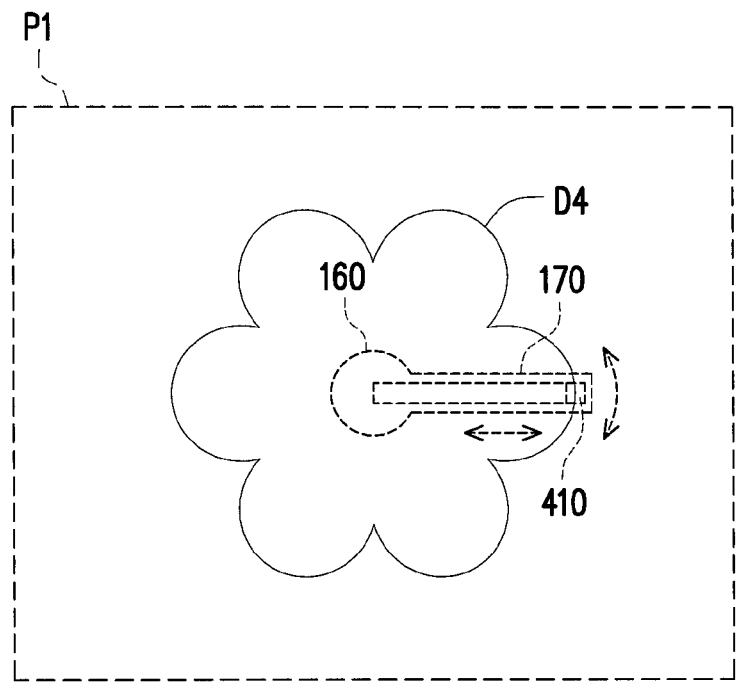
FIG. 7 is a schematic view of one of the trace patterns generated by a light source of FIG. 6.

FIG. 6 is a schematic partial view of a three-dimensional printing apparatus according to another exemplary embodiment for illustrating a light source part of the three-dimensional printing apparatus. FIG. 7 is a schematic view of one of the trace patterns generated by the light source of FIG. 6.

Referring to FIGS. 6 and 7 at the same time, in this embodiment, only one light-emitting element is disposed on the rotating arm 170 as a light source 410 of this embodiment. Also, this embodiment further differs from the embodiments above in that the light source 410 of this embodiment is movably disposed on the rotating arm 170 relative to the rotating shaft 160 along a radial direction D3 (as indicated by a double-arrow sign in the figures). In this way, by using the control unit 130 (shown in FIG. 1) to control, a moving trace D4 shown in FIG. 7 is formed by making use of back-and-forth movements of the light source 410 on the rotating arm 170 in addition to rotation of the rotating arm 170 relative to the rotating shaft 160. However, the exemplary embodiment does not limit a pattern of the trace. By controlling the movement of the light source 410, the movement of the rotating arm 170, and a light-emitting frequency of the light source 410 and appropriately combining the movement of the light source 410, the movement of the rotating arm 170, and the light-emitting frequency of the light source 410, the patterns and ranges of the trace patterns of the irradiation of the light source 410 on the liquid-state forming material 200 may be increased. In other words, a light trace of the light source 410 of this embodiment on the irradiation plane P1 may be considered as a combined vector of the moving trace D2 and the radial direction D3. Similarly, in an embodiment that is not shown herein, a plurality of movable light-emitting elements may be disposed on the rotating arm.

Figure 8:
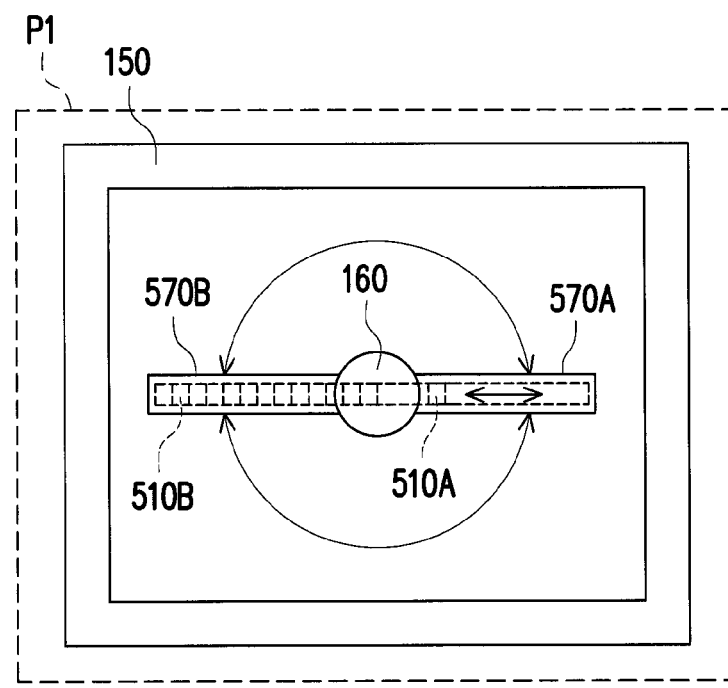
FIG. 8 is a schematic partial view of a three-dimensional printing apparatus according to yet another exemplary embodiment.

FIG. 8 is a schematic partial view of a three-dimensional printing apparatus according to yet another exemplary embodiment for illustrating a light source part of the three-dimensional printing apparatus. What differs from the embodiments above is that there are two rotating arms 570A and 570B in this embodiment, and the rotating arms 570A and 570B are respectively connected to the rotating shaft 160 and respectively extend along the radial direction relative to the rotating shaft 160. Light sources 510A and 510B are respectively disposed on the rotating arms 570A and 570B. The light source 510A located on the rotating arm 570A is formed of a light-emitting element capable of moving back and forth along the rotating arm 570A, whereas the light source 510B located on the rotating arm 570B is formed of a plurality of light-emitting elements arranged along the radial direction. In this way, the three-dimensional printing apparatus is capable of selectively providing light or increasing types of the moving traces of the light source according to the control unit 130 (shown in FIG. 1) by making use of multiple configurations and movements of the light source. Based on the above, modifications to the light source disposed on the rotating arm with respect to the quantity, configuration and movement are all applicable to the exemplary embodiment.

In view of the foregoing, in the embodiments above, the three-dimensional printing apparatus adjusts the movement of the light source under the tank to make the moving trace of the light source on the irradiation plane a curve, so as to prevent a sawtoothed appearance when forming a non-linear profile in the process of solidifying the liquid-state forming material through light radiation. In addition, the designer may adjust the quantity, configuration, and movement of the light source accordingly, so as to increase the types of the light trace of the movable light source on the irradiation plane and expand the applicable range. Thus, with the relevant structure and configuration of the light source, the three-dimensional object printed according to the exemplary embodiment has a preferable appearance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A three-dimensional printing apparatus, comprising:
    a tank, filled with a liquid-state forming material;
    a movable platform, movably disposed at the tank, wherein a portion of the movable platform is immersed in the liquid-state forming material;
    a rotating shaft, disposed under the tank;
    a rotating arm, connected with the rotating shaft, wherein the rotating arm is driven by the rotating shaft to rotate; and
    at least one light source, disposed on the rotating arm to rotate with the rotating arm,
    wherein the light source provides light to irradiate the liquid-state forming material to solidify a portion of the liquid-state forming material in layers along with the portion of the movable platform moving in the liquid-state forming material to form a three-dimensional object on the movable platform.

2. The three-dimensional printing apparatus as claimed in claim 1, wherein a moving trace of the light source is a curve.

3. The three-dimensional printing apparatus as claimed in claim 1, wherein a moving trace of the light source is at least a portion of a circle.

4. The three-dimensional printing apparatus as claimed in claim 1, wherein the rotating arm extends along a radial direction relative to the rotating shaft.

5. The three-dimensional printing apparatus as claimed in claim 1, wherein the light source is movably disposed on the rotating arm.

6. The three-dimensional printing apparatus as claimed in claim 1, further comprising:
    a plurality of light sources, disposed on the rotating arm along a radial direction, wherein at least a portion of the light sources selectively provides light to irradiate the liquid-state forming material in the tank.

7. A three-dimensional printing apparatus, comprising:
    a tank, filled with a liquid-state forming material;
    a movable platform, movably disposed at the tank, wherein a portion of the movable platform is immersed in the liquid-state forming material;
    a rotating shaft, disposed above the tank;
    a rotating arm, connected with the rotating shaft, wherein the rotating arm is driven by the rotating shaft to rotate; and
    at least one light source, disposed on the rotating arm to rotate with the rotating arm wherein the light source provides light to irradiate the liquid-state forming material to solidify a portion of the liquid-state forming material in layers along with the portion of the movable platform moving in the liquid-state forming material to form a three-dimensional object on the movable platform.

8. The three-dimensional printing apparatus as claimed in claim 7, wherein a moving trace of the light source is a curve.

9. The three-dimensional printing apparatus as claimed in claim 7, wherein a moving trace of the light source is at least a portion of a circle.

10. The three-dimensional printing apparatus as claimed in claim 7, wherein the rotating arm extends along a radial direction relative to the rotating shaft.

11. The three-dimensional printing apparatus as claimed in claim 7, wherein the light source is movably disposed on the rotating arm.

12. The three-dimensional printing apparatus as claimed in claim 7, further comprising:
  a plurality of light sources, disposed on the rotating arm along a radial direction, wherein at least a portion of the light sources selectively provides light to irradiate the liquid-state forming material in the tank.

* * * * *